Aug. 23, 1960 D. FOUST 2,949,767
LEAK TESTER FOR AUTOMOBILE TIRES
Filed July 25, 1956
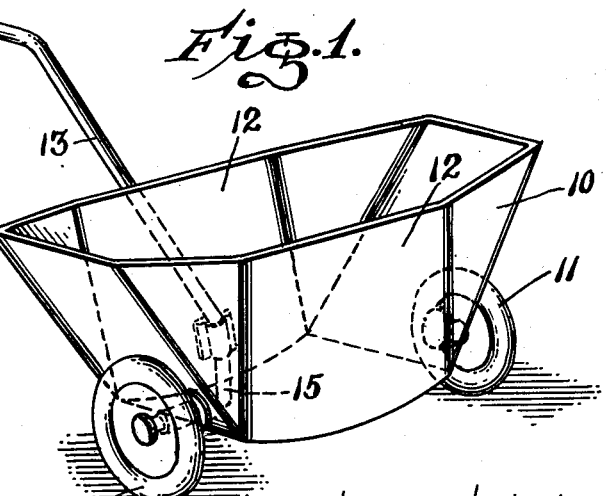
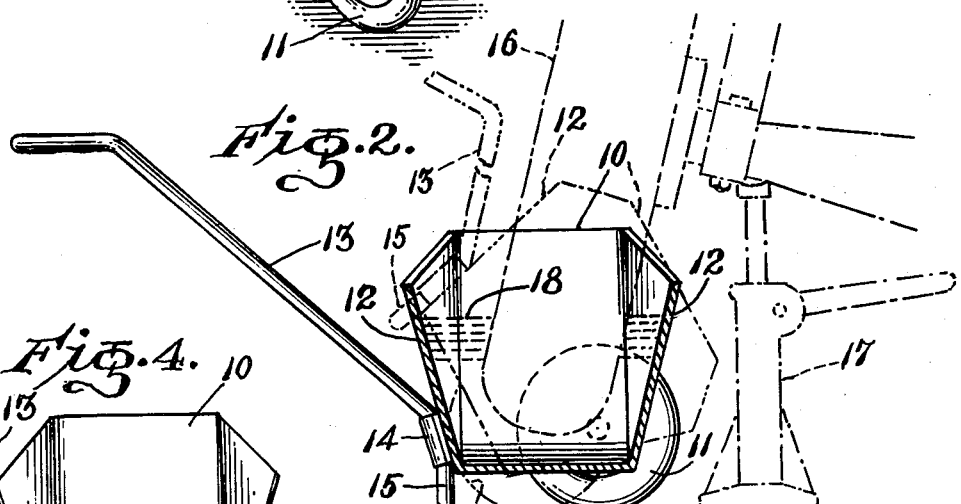
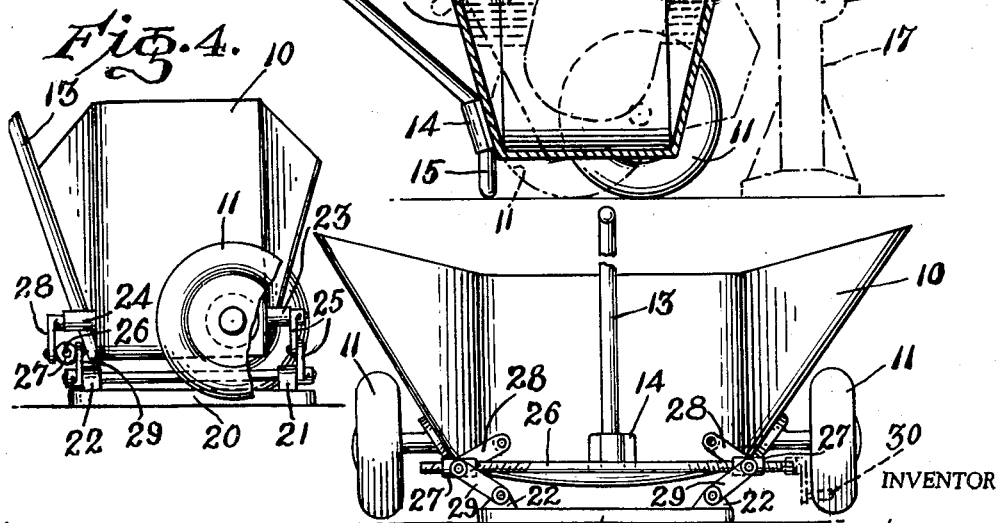
INVENTOR
Dwight Foust
BY
ATTORNEY

United States Patent Office 2,949,767
Patented Aug. 23, 1960

2,949,767

LEAK TESTER FOR AUTOMOBILE TIRES

Dwight Foust, Rte. 1, Cullman, Ala.

Filed July 25, 1956, Ser. No. 600,097

1 Claim. (Cl. 73—45.6)

The present invention relates to a leak tester for automobile tires and it consists in the combinations, constructions and arrangements of parts herein described and claimed.

Generally there is provided a device for determining the location of leaks in pneumatic tires and particularly the "tubeless" tire which device enables a tire to be tested while the same remains in its normal position upon an automobile or the like. Essentially the device comprises a container having supporting wheels and an elongated handle and the device is such that the container may be partially filled with water and quickly and easily positioned beneath an automobile wheel which has previously been jacked to an elevated position whereupon the wheel may be rotated and the leak easily discovered in the tire by the emanation of air bubbles from the tire into the water. In a modified form of the invention there is provided a jack for lifting the container to a position closer to the tire to be tested after the container has been positioned beneath the tire.

It is accordingly an object of the invention to provide a novel tire testing device.

Still another object of the invention is to provide a device of the character set forth which is simple in construction, inexpensive to manufacture and yet effective and efficient in use.

A further object of the invention is to provide, in a device of the character set forth, novel supporting means therefor.

A further object of the invention is to provide, in a device of the character set forth, a novel jack forming a part of the invention.

Other and further objects of the invention will become apparent from a reading of the following specification taken in conjunction with the drawing, in which:

Figure 1 is a perspective view of an embodiment of the invention,

Figure 2 is a vertical sectional view of the device shown in Figure 1,

Figure 3 is a rear elevational view of a modified form of the invention, and

Figure 4 is a side elevational view, partly broken away, of the device shown in Figure 3.

Referring more particularly to the drawing, there is shown therein, in Figures 1 and 2, an elongated open-topped container 10 having a supporting wheel 11 at each of its narrower ends.

The container 10 is provided with outwardly and upwardly flared central portions 12 in its front and rear walls. An elongated handle 13 is centrally affixed to the rear wall of the container 10 by means of a bracket 14 and a continuation of the handle 13 extends downwardly from the bracket 14 to provide a supporting foot member 15.

In operation, a tire to be tested which is indicated in broken lines at 16 is first brought to an elevated position by means of a jack 17 likewise indicated in broken lines in Figure 2. Water, indicated at 18, is then placed within the container 10 and the container may then be manipulated by means of the handle 13 to a position where it will encompass the lower portion of the tire 16, as indicated in Figure 2. The tire 16 may then be rotated through the water 18 and any leaks therein will be indicated by air bubbles emanating from the tire 16 through the water 18.

In the modified form of the invention illustrated in Figures 3 and 4 a jack is provided for the device and consists of a base 20 having a pair of upstanding forward ears 21 and a like pair of rearward ears 22. There is also provided a pair of forward studs 23 fixed to the forward side of the container 10 and a like pair of rearwards studs 24 affixed to the rear face of the container 10.

Pairs of links 25 pivotally interconnect the studs 23 and ears 21. A transverse shaft 26 is provided with a pair of oppositely threaded collars 27, one threaded upon each end portion thereof. Links 28 interconnect the studs 24 with the collars 27 while links 29 interconnect the ears 22 with the collars 27.

In the operation of this form of the invention, the device is first placed in a position beneath the elevated tire 16 and then, in order to immerse a greater portion of the tire 16 in the water 18 contained in the device, the container 10 itself may be raised by means of the jack, a handle 30 being removably connected to one end of the shaft 26. It will be apparent by revolving the shaft 26 by means of the handle 30, the links 25, 28 and 29 will be brought to positions approaching the vertical thus forcing the container 10 in an upward position away from the base 20 and thus allowing the tire 16 to be immersed to a greater extent into the water 18, it being further apparent that the testing of the tire will be again as above described.

While but two forms of the invention have been shown and described herein, it will be readily apparent to those skilled in the art that many minor modifications may be made without departing from the spirit of the invention or the scope of the appended claim.

What is claimed is:

A leak testing device for mounted automobile tires comprising an open-topped container having a bottom, a relatively wide front wall, a rear wall of equal width to said front wall, an outwardly and upwardly flared central portion in each of said front and rear walls, said central portions having horizontally extending upper edges, a pair of relatively narrow outwardly and upwardly flaring side walls interconnecting adjacent edges of said front and rear walls and having horizontally extending upper edges in a plane substantially above that in which lie the upper edges of said central portions of said front and rear walls, a pair of side portions in each of said front and rear walls, said side portions having upper edges extending angularly upwardly and outwardly from the upper edges of said central portions to the upper edges of said side walls, a vertically dependent supporting foot member attached to said rear wall, and a pair of supporting wheels each mounted upon an opposite side wall, whereby water may be placed in said container and said container manipulated by said handle to a position encompassing the lower portion of a partially raised mounted tire with said lower portion of said tire immersed in water to determine air leakage from said tire as it is rotatably moved therethrough.

References Cited in the file of this patent

UNITED STATES PATENTS

| | | |
|---|---|---|
| 1,994,015 | Curran | Mar. 12, 1935 |
| 2,151,497 | Bolte | Mar. 21, 1939 |
| 2,249,019 | Masters | July 15, 1941 |
| 2,502,579 | McKibben | Apr. 4, 1950 |
| 2,739,784 | Thompson et al. | Mar. 27, 1956 |